United States Patent [19]

Kiuchi

[11] Patent Number: 4,951,498
[45] Date of Patent: Aug. 28, 1990

[54] METHOD FOR TESTING INTERNAL COMBUSTION ENGINE

[75] Inventor: Naoyuki Kiuchi, Osaka, Japan
[73] Assignee: Daifuku Co., Ltd., Japan
[21] Appl. No.: 416,861
[22] Filed: Oct. 4, 1989
[30] Foreign Application Priority Data
Nov. 4, 1988 [JP] Japan .................................. 63-279595
[51] Int. Cl.$^5$ .......................................... G01M 15/00
[52] U.S. Cl. .................................................. 73/117.3
[58] Field of Search ............................ 73/117.3, 116; 198/502.1

[56] References Cited
U.S. PATENT DOCUMENTS
3,527,087 9/1970 Converse et al. ................... 73/117.3
4,285,233 8/1981 Swis ....................................... 73/116

*Primary Examiner*—Jerry W. Myracle
*Attorney, Agent, or Firm*—Barnes, Kisselle, Raisch, Choate, Whittemore & Hulbert

[57] ABSTRACT

The invention relates to a method of testing internal combustion engines. First testing units for internal combustion engines are provided at a plurality of peripheral locations on a turntable, and a testing chamber having a second testing unit is provided at one side of a carrying-out path running from the turntable. Each internal combustion engine is first warmed up by one of the first testing units on the turntable and thereafter it is subjected to adjustment in operating conditions. Subsequently, the internal combustion engine is delivered to the second testing unit in the testing chamber in which abnormal noise and vibration measurement and collection of data during engine operation are made.

3 Claims, 3 Drawing Sheets

METHOD FOR TESTING INTERNAL COMBUSTION ENGINE

FIELD OF THE INVENTION

This invention relates to a method for testing internal combustion engines, employed, for example, in an automobile assembly plant in carrying out a performance test with respect to each internal combustion engine prior to being incorporated into an automotive body.

BACKGROUND OF THE INVENTION

Various testing apparatuses for internal combustion engines have been known including those of the in-line system and those of the turntable system.

In the in-line system, each internal combustion engine delivered by a main conveyor is transferred onto a carriage which, in turn, transfers the internal combustion engine to one of separate testing units disposed alongside a circuit as the carriage travels along the circuit. The testing units are installed in separate testing chambers each defined by an enclosure or partition walls, and they individually carry out performance tests with respect to internal combustion engines which have been individually transferred to them from the carriage. As each internal combustion engine has undergone the required performance test, it is fetched onto the carriage which, in turn, is caused to travel along the circuit before the internal combustion engine is delivered onto the main conveyor.

In the turntable system, a plurality of testing units are arranged on a turntable. Each internal combustion engine delivered by a main conveyor is loaded through a carrying-in conveyor or the like onto a carrying-in transfer device which, in turn, delivers the internal combustion engine to a testing unit. The turntable is intermittently rotated so that the required performance test is carried out while the turntable makes one turn. After the performance test is carried out, the internal combustion engine is fetched by a carrying-out transfer device from which it is transferred onto the main conveyor through a carrying-out conveyor.

In either of these systems, testing operation at each testing unit is carried out in such a way that each internal combustion engine is first driven for warming up and then it is subjected to various adjustments in operating conditions, such as idling adjustment, ignition timing adjustment, and exhaust gas adjustment. Further, in this process of testing operation, abnormal noise and vibration measurements and collection of relevant data, such as engine speed, negative pressure, oil pressure, and ignition timing, are made.

Of these known systems, the in-line system, in which internal combustion engines are placed in separate testing chambers for performance tests, has an advantage in that tests can be carried out without noise interference involved between individual internal combustion engines, which permits accurate measurement of abnormal noise and vibration behaviors. Another advantage of the in-line system is that since the testing chambers are stationarily placed on the ground, various data on each internal combustion engine may be obtained as required for entry into a host computer. On the other hand, however, the in-line system has a disadvantage in that one operator is required to look after a plurality of testing chambers with tasks of setting internal combustion engines to individual testing units, conducting performance tests with them, and releasing the engines from the condition of setting, which fact permits no speedy operation and means less operating efficiency. In other words, the number of chambers that one operator can look after is limited and accordingly, when all the testing chambers are operated, a number of operators must be engaged in testing operations. Each operator must be skilled in various kinds of tests involved.

Such disadvantage of the in line system can be overcome by the turntable system. However, the turntable system does not permit accurate measurement of abnormal noise and vibration involved because it is likely to involve noise interference between adjacent internal combustion engines. In addition, the turntable system is disadvantageous in that entry of data into the host computer is not possible except when, for example, the turntable is not in rotation.

SUMMARY OF THE INVENTION

The object of the invention is to provide a method for testing internal combustion engines which eliminates the above noted disadvantages of the two prior-art systems.

In order to accomplish this object according to the invention there is provided a method for testing internal combustion engines comprising:
providing first testing means for internal combustion engines at a plurality of peripheral locations on a turntable,
providing carrying-in and carrying-out paths for internal combustion engines outside the turntable,
providing testing chamber means having second testing means at one side of the carrying-out path,
delivering each internal combustion engine from the carrying-in path to one of the first testing means and subjecting the engine to warming up,
adjusting operating conditions with respect to the internal combustion engine while the engine is in operation, and then stopping the engine,
fetching the internal combustion engine onto the carrying-out path and then placing the engine in the testing chamber means,
operating the internal combustion engine again in the testing chamber means and making measurement of abnormal noise and vibrations involved and collection of relevant data with respect to the engine in operation, and
removing the internal combustion engine from the testing chamber means and transporting the engine outward through a carrying-out path.

According to the invention, the internal combustion engine delivered to the first testing means on the turntable is first subjected to warming up while the turntable is in rotation, and is then subjected to various adjustments in respect of operating conditions, such as idling adjustment, ignition timing adjustment, and exhaust gas adjustment, by a minimum number of operators present on the turntable. Each internal combustion engine which has undergone such adjustments is caused to stop running, and after being fetched onto the carrying-out path it is delivered to the second testing means in the testing chamber means. In this second testing means the internal combustion engine is again put in operation. In this case, the internal combustion engine is still warm as a result of the warming up carried out on the turntable, and therefore testing with the engine can be immediately commenced without warming up being required. Measurement of abnormal noise and vibrations involved in the operation of the internal combustion engine, which is made by the operator using his ears, can be made without interference of any other noise, since the testing chamber means is isolated from the exterior. The fact that the second testing means is installed on the ground permits entry of test data, such as engine speed, negative pressure, oil pressure, and ignition timing, into the ground-side host computer whenever such entry is required.

When a plurality of internal combustion engines have been adjusted in their operating conditions by first testing means and fetched onto the carrying-out path, only some of them may be placed in the testing chamber means for testing, while the others may be transported outward without being placed in the testing chamber means. Thus it is possible to arrange for testing all the internal combustion engines, or only some of them on a sample test basis, by the second testing means in the testing chamber means.

Such arrangement is possible that a plurality of internal combustion engines are loaded onto the carrying in path and some of them are delivered to first testing means for adjustment in relevant operating conditions, while the others are transferred from the carrying-in path to the carrying-out path via conveyor means without being delivered to first testing means so as to be subjected to testing by the second testing means in the testing chamber means. Thus it is possible to perform testing of all the internal combustion engines by first testing means on the turntable or to perform such testing with respect to only some of them on a sample test basis.

DESCRIPTION OF THE PREFERRED EMBODIMENTS

Figure 1:
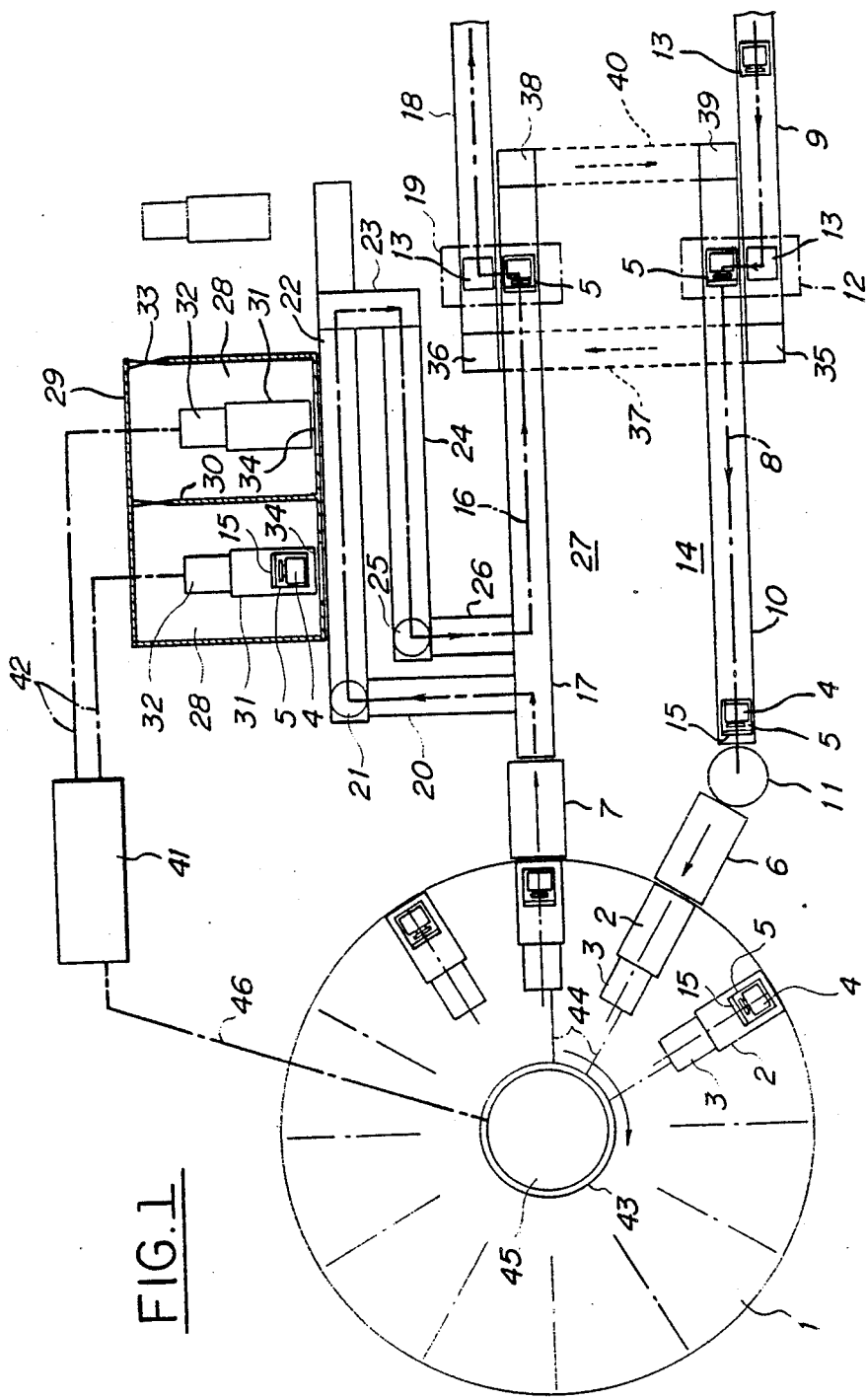
FIGS. 1 to 3 are, respectively, plan views showing testing apparatuses for internal combustion engines which represent first to third embodiments according to the method of the invention.

One embodiment of the invention will now be described in detail with reference to FIG. 1.

Reference numeral 1 designates a turntable on which first testing units 2 are radially disposed at a plurality of peripheral locations spaced at specified angle intervals (12 locations spaced at 80 degree intervals in the present embodiment). Each of the first testing units 2 has a control unit 3. Internal combustion engines 4 are each handled in such condition that it is placed on a testing pallet 6. Provided outside the turntable 1 are a carrying-in device 6 for delivery of internal combustion engines 4 to first testing units 2 and a carrying-out device 7 for delivery of internal combustion engines 4 away from first testing units 2, the device 6, 7 being disposed adjacent to each other but spaced apart by above specified angle (30 degree). A carrying-in path 8 whose terminating end reaches the carrying-in device 6 comprises a first carrying-in conveyor 9 running from an assembly line, a second carrying-in conveyor 10 whose starting end is parallel to the terminating end of the first carrying in conveyer 9, an orientation changing table 11 provided between the terminating end of the second carrying in conveyer 10 and the carrying-in device 6, and a carrying-in side transfer device 12 for transfer of internal combustion engine between the conveyors 9 and 10.

Each internal combustion engine 4 from the assembly line is handled as placed on a transport pallet 13, and subsequently it is transferred from the transport pallet 13 to a testing pallet 5. At one side of the second carrying-in conveyor 10 there is provided a connection work site 14 at which hose connection between a junction 15 provided in the pallet 5 and relevant portions of the internal combustion engine 4 is carried out.

A carrying-out path 16 running from an outer end of the carrying-out device 7 consists of a first carrying-out conveyor 17 running parallel to the second carrying in starting end parallel to a terminating end of the first carrying-out conveyor 17 and extending to an outward delivery section, a carrying out side transfer device 19 for transfer of internal combustion engine 4 only between the conveyors 17 and 18, a branch conveyor 20 provided in rectangular relation to a midportion of the first carrying-out conveyor 17, a testing section conveyor 22 provided in rectangular relation to the branch conveyor 20 through an orientation changing table 21, a delivery conveyor 23 connected to a terminating end of the testing section conveyor 20 in rectangular relation thereto, a return conveyor 24 rectangular to a terminating end of the delivery conveyor 23 and extending parallel to the testing section conveyor 22, and a combined conveyor 26 provided in rectangular relation to a terminating end of the return conveyor 24 through an orientation changing table 25 and whose terminating end is rectangular to the first carrying-out conveyor 17 downstream of the branch conveyor 20. At one side of the first carrying-out conveyor 17 and downstream of the combined conveyor 26 there is provided a disconnection work site 27 for hose disconnection or the like work.

Testing chambers 28 are provided alongside the testing section conveyor 22 running alongside the carrying-out path 16. The testing chambers 28 are two in number (which may be one or more than two in number), being defined by an enclosure 29 and a partition wall 30. A second testing unit 31 is disposed within each of the testing chambers 28 and it has a control unit 32 and a transfer device (not shown). Each control unit 32 is connected to a ground-side host computer 41 via line 42 and operates to issue and receive various operating signals and test data signals. Shown by 33 is a doorway with an open close door, and shown by 34 is a transfer port of the like nature.

The terminating end of the first carrying in conveyor 9 and the starting end of the second carrying-out conveyor 18 are interconnected by elevator units 35, 36 and a transport pallet return conveyor 37 installed underground, and the terminating end of the first carrying out conveyor 17 and the starting end of the second carrying-in conveyor 10 are interconnected by elevator units 38, 39 and a testing pallet return conveyor 40. The control unit 3 of each first testing unit 2 is connected via line 44 to a table side transmitter-receiver unit 43 provided centrally on the turntable 1, and a ground-side transmitter receiver unit 45 provided on the ceiling side and in opposed relation to the table-side transmitter-receiver unit 43 is connected to the host computer 41 via line 46.

The manner of operation of testing internal combustion engine 4 will be explained.

An internal combustion engine 4 delivered by the first carrying-in conveyor 9 while being supported on a pallet 13 is brought to a stop in opposed relation to the carrying-in side transfer device 12. Then, the internal combustion engine 4 is unloaded by the transfer device 12 from the transport pallet 13 and is in turn loaded onto an empty testing pallet 5 on the second carrying-in conveyor 10. While being transported by the second carrying-in conveyor 10, the internal combustion engine 4 is subjected to hose connection with the testing pallet 5 and then to orientation adjustment by the orientation changing table 11.

Subsequently, the internal combustion engine 4, together with the testing pallet 6, is delivered to one of the first testing units 2 through the carrying in device 6. Relevant connection to the junction 15 is automatically made. Thereafter, the internal combustion engine 4 is driven for warming up. At this stage, the turntable i is in regular intermittent rotation. After the step of warming up, adjustments in various operating conditions, such as idling adjustment ignition timing adjustment and exhaust gas adjustment, are carried out by a minimum number of operators present on the turntable 1 with respect to the internal combustion engine 4. After passing through such stage of adjustment, the internal combustion engine 4 is ca used to stop running, whereupon it is disconnected from the junction 15. Then, the internal combustion engine 4, together with the testing pallet 5, is fetched by the carrying-out device 7 for transfer onto the first carrying-out conveyor 17. Various operating signals to the first testing unit 2, and test data signals stored in the control unit 3 are transmitted from and received into the host computer 41 through the transmitter-receiver units 43, 45, etc. Such signal transmission and reception is carried out within a limited space of time, e.g., when the turntable has stopped turning.

The internal combustion engine 4 on the first carrying-out conveyor 17 is transferred onto the branch conveyor 20 and, after an orientation change is effected by the orientation changing table 21, it is transferred onto the testing section conveyor 22. The internal combustion engine 4 on the testing section conveyor 22 is transferred, together with the testing pallet 5, to one of the second testing units 31 through a transfer port 34.

After the required connection is made at the second testing unit 31, the internal combustion engine 4 is put in operation. In this conjunction, it is noted that the internal combustion engine 4, which has been warmed up on the turntable, is still hot and therefore the required testing may be commenced immediately without requiring time for warming up. In this testing, measurement of abnormal noise and vibrations involved in the operation of the internal combustion engine 4 is made by the operator using his ears. Since the testing chamber 28 is isolated from the exterior, the test is subject to no interference from any other noise and accurate measurement (judgment) can be made. Additionally, during the engine run, various test data, such as engine speed, negative pressure, oil pressure, and ignition timing, can be obtained, which may be entered into the host computer 41 whenever so required.

The internal combustion engine 4 which has undergone the required tests is caused to stop running and is then returned to the testing section conveyor 22. Subsequently, the internal combustion engine 4 is transported through a route consisting of the delivery conveyor 23, return conveyor 24, orientation changing table 25, and combined conveyor 26 in that order, and is then returned to the first carrying-out conveyor 17 for being conveyed until it reaches the carrying out side transfer device 19. On the second carrying-out conveyor 18 and at a site corresponding to the transfer device 19, the transport pallet 13 is now in its waiting position. As earlier mentioned, the transport pallet 13 has been emptied at the end of its transport on the first carrying-in conveyor 9 and then conveyed through the elevator unit 38 and return conveyor 37 to the elevator unit 36. Accordingly, the internal combustion engine 4 which has passed through the required tests is unloaded by the transfer device 19 from the testing pallet 6 and loaded onto the transport pallet 13 for transport to the delivery section. The now emptied testing pallet 5 is returned to the second carrying-in conveyor 10 through the elevator unit 38, return conveyor 40, and elevator unit 39.

Figure 2:
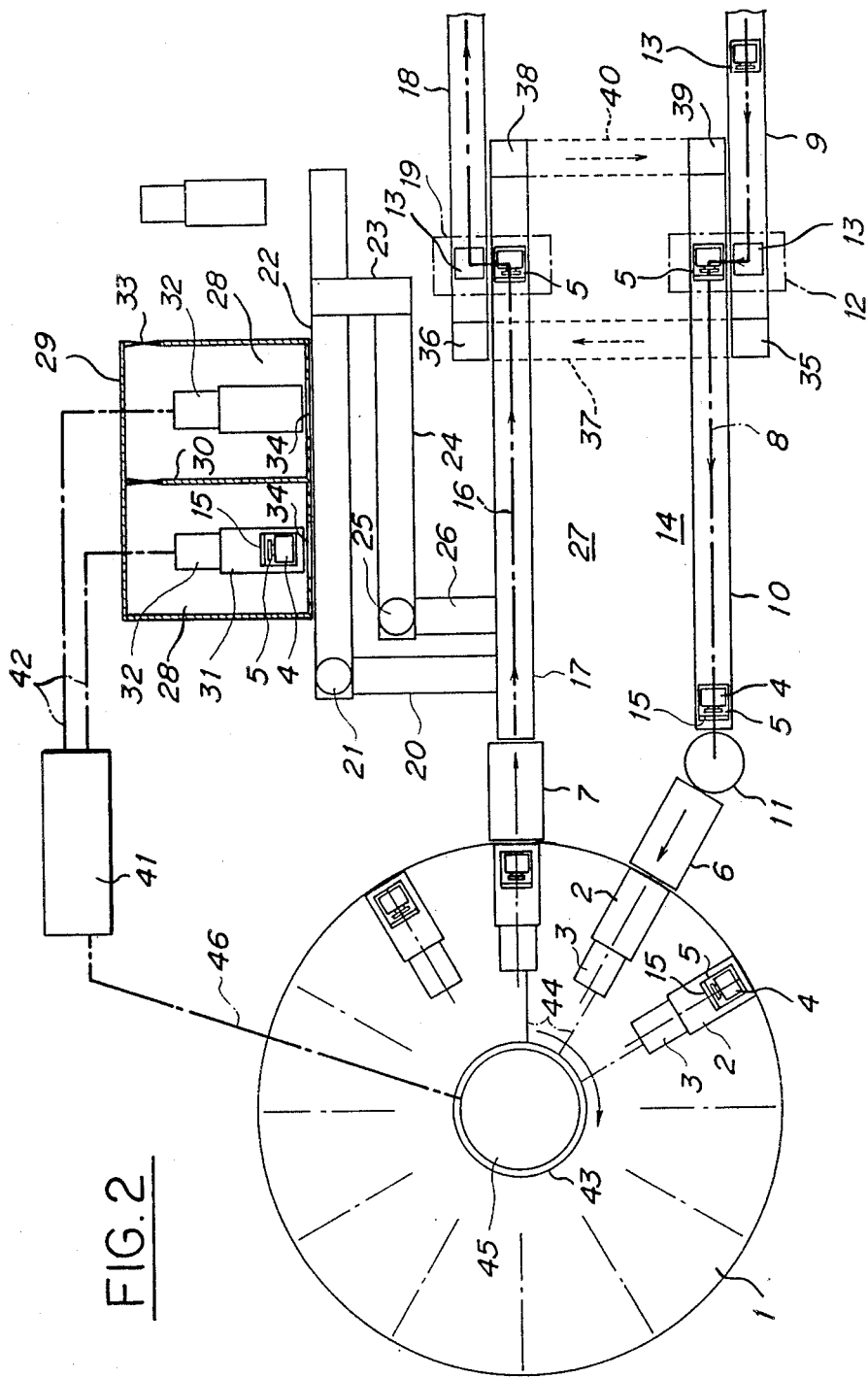

Another embodiment of the invention will be explained with reference to FIG. 2.

In this embodiment, the arrangement is such that a large majority of the internal combustion engines 4 which, after being subjected to adjustment in respect of various operating conditions, have been fetched onto the first carrying-out conveyor 17 via the carrying-out device 7 are delivered outward without being placed in testing chambers 28. In other words, only some of the plurality of internal combustion engines 4 are delivered to testing chambers 28 for being tested by second testing units 31 in the same way as in FIG. 1.

Figure 3:
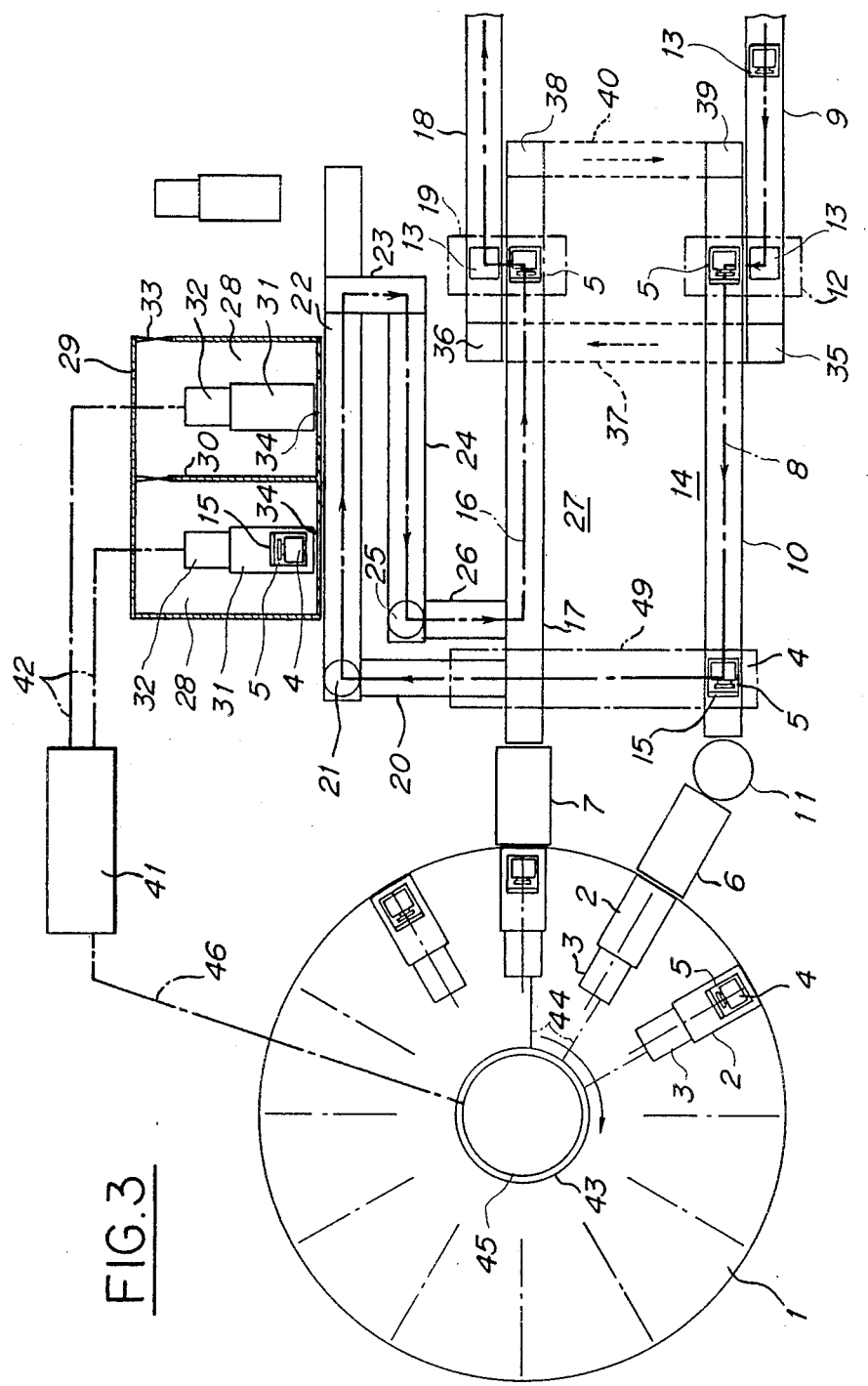

A further embodiment of the invention will be described with reference to FIG. 3.

In this third embodiment, a transport device 49, such as a crane, is provided between the terminating end of the second transport conveyor 10 and the starting end o the first carrying-out conveyor 17. A large majority of the internal combustion engines 4 transferred from the first carrying-in conveyor 9 to the second carrying-in conveyor 10 are transported by the transport device 49 to the starting end of the first carrying-out conveyor 17 without being delivered to first testing units 2. Then, they are delivered from the first carrying-out conveyor 17 to testing chambers 28 by the branch conveyor 20 and others so that they are subjected to testing by second testing units 31 only. In other words, only some of the plurality of internal combustion engines 4 are delivered to the turntable 1 for being tested by first testing units 2 as in FIG. 1.

What is claimed is:

1. A method for testing internal combustion engines comprising:
    providing first testing units for internal combustion engines at a plurality of peripheral locations on a turntable,
    providing carrying-in and carrying-out paths for internal combustion engines outside the turntable,
    providing testing chamber means having second testing means at one side of the carrying-out path,
    delivering each internal combustion engine from the carrying-in path to one of the first testing means and subjecting the engine to warming up,
    adjusting operating conditions with respect to the internal combustion engine while the engine is in operation, and then stopping the engine,
    fetching the internal combustion engine onto the carrying-out path and then placing the engine in the testing chamber means,
    operating the internal combustion engine again in the testing chamber means and making measurement of abnormal noise and vibrations involved and collection of relevant data with respect to the engine in operation, and
    removing the internal combustion engine from the testing chamber means and transporting the engine outward through a carrying-out path.

2. A method for testing internal combustion engines as set forth in claim 1, further comprising:
supplying a plurality of internal combustion engines to the carrying-in path,
placing into the testing chamber means for testing therein only some of the internal combustion engines fetched from the first testing means onto the carrying-out path, and
delivering outward the remaining internal combustion engines after the engines are fetched onto the carrying out path and without being placed in the testing chamber means.

3. A testing method for internal combustion engines as set forth in claim 1, further comprising:
providing transport means between the carrying-in path and the carrying-out path,
supplying a plurality of internal combustion engines to the carrying-in path,
delivering only some of the internal combustion engines to the first testing means for subjecting the engines to adjustments in respect of operating conditions, and
delivering the remaining internal combustion engines to the carrying-out path by the transport means for subjecting the engines to testing in the testing chamber means, without delivering the engines from the carrying-in path to the first testing means.

* * * * *